United States Patent
Ochiai et al.

(10) Patent No.: US 6,482,122 B2
(45) Date of Patent: Nov. 19, 2002

(54) DRIVING FORCE CONTROL DEVICE

(75) Inventors: Tatsuo Ochiai, Fuji; Hiroyuki Ashizawa; Akira Higashimata, both of Yokohama, all of (JP)

(73) Assignee: JATCO TransTechnology Ltd. (JP)

( * ) Notice: Subject to any disclaimer, the term of this patent is extended or adjusted under 35 U.S.C. 154(b) by 0 days.

(21) Appl. No.: 09/861,018

(22) Filed: May 18, 2001

(65) Prior Publication Data

US 2001/0056009 A1 Dec. 27, 2001

(30) Foreign Application Priority Data

May 22, 2000 (JP) ........................................ 2000-149184

(51) Int. Cl.$^7$ .............................................. B60K 41/12
(52) U.S. Cl. ............................. 477/42; 477/43; 477/97; 477/108; 701/54; 701/96
(58) Field of Search ............................ 477/42, 43, 97, 477/108; 701/54, 55, 65, 96

(56) References Cited

U.S. PATENT DOCUMENTS

| | | | | |
|---|---|---|---|---|
| 4,720,793 A | * | 1/1988 | Watanabe et al. | 477/43 |
| 5,003,948 A | * | 4/1991 | Churchill et al. | 123/352 |
| 5,902,345 A | * | 5/1999 | Minowa et al. | 701/96 |
| 5,954,777 A | * | 9/1999 | Cao et al. | 477/97 |
| 6,066,070 A | * | 5/2000 | Ito et al. | 477/43 |
| 6,151,542 A | * | 11/2000 | Yoshino et al. | 477/108 |
| 6,181,020 B1 | * | 1/2001 | Uchida et al. | 477/43 |
| 6,311,122 B1 | * | 10/2001 | Higashimata | 701/96 |
| 6,385,529 B1 | * | 5/2002 | Minowa et al. | 701/96 |
| 6,405,120 B1 | * | 6/2002 | Higashimata et al. | 701/96 |

* cited by examiner

*Primary Examiner*—Sherry Estremsky
(74) *Attorney, Agent, or Firm*—Rossi & Associates

(57) ABSTRACT

A driving force control device, which controls a driving force by changing a gear ratio of an automatic transmission, comprises: a virtual throttle opening converter for converting a target driving force into a virtual throttle opening by using a target driving force characteristic and a detected vehicle speed; a throttle opening information selector for selecting the virtual throttle opening from the virtual throttle opening converter as throttle opening information when the driving force is controlled, and selecting an actual throttle opening from the throttle opening sensor as throttle opening information when the driving force is not controlled; and a target input revolutionary speed calculator 123*d* that calculates the target input revolutionary speed according to the selected throttle opening information, the detected vehicle speed and one shift map. The Continuously variable transmission determines an achievable gear ratio according to the target input revolutionary speed.

5 Claims, 4 Drawing Sheets

DRIVING FORCE CONTROL DEVICE

BACKGROUND OF THE INVENTION

1. Field of the Invention

The present invention relates to a driving force control device that controls a gear ratio of an automatic transmission to achieve a target driving force or a target driving torque (hereinafter only referred to as a target driving force) which is calculated by a vehicle distance control unit, a vehicle speed control device and so forth.

2. Description of the Prior Art

Conventionally, Japanese Patent Publication No. 06-68324 is known as an example of a conventional control device for an automatic transmission in a vehicle that is equipped with the automatic transmission and an automatic speed control device which maintains a constant vehicle speed.

According to the publication, the object is to properly control a shifting operation while a constant-speed regulation is executed and also control the shifting operation correspondingly to a driver's operation while the constant-speed regulation is not executed. According to the publication, the shifting operation is controlled according to a shift map based on a throttle opening (angle) of a throttle valve while the constant-speed regulation is executed, and the shifting operation is controlled according to a shift map based on an operated input of an accelerator pedal while the constant-speed regulation is not executed.

According to the above conventional control device for the automatic transmission, however, the two shift maps must be prepared to control the shifting operation. This necessitates setting the shift transition characteristics for the respective shift maps, and makes it complicated to apply the control device to the vehicle.

More specifically, if the automatic transmission is a multi-speed transmission, it is necessary to reduce a shift shock by controlling hydraulic pressure and line pressure in a shift transitional period in different manners between the two shift maps. If the automatic transmission is a continuously variable transmission, it is necessary to properly tune a shift speed by controlling the shift transition in different manners between the two shift maps.

There is the following disadvantage if the conventional control device for the automatic transmission is applied to a driving force control device that achieves a target driving force by changing a gear ratio of the automatic transmission in a vehicle equipped with a device for controlling a vehicle distance (the distance between the vehicle and a vehicle running ahead) or a device for controlling a vehicle speed by the driving force. Because the different shift maps are used according to whether the driving force is controlled or not, the shift transition characteristics must be set for the respective shift maps. It is therefore complicated to apply the control device to the vehicle.

SUMMARY OF THE INVENTION

It is therefore an object of the present invention to provide a driving force control device that is able to control a driving force by changing a gear ratio of an automatic transmission with the same shift transition characteristic irrespective of whether the driving force is controlled or not.

The above object can be accomplished by providing a driving force control device, which controls a gear ratio of an automatic transmission to thereby achieve a target driving force calculated by an onboard control device, the driving force control device comprising: vehicle speed sensor for detecting a vehicle speed; throttle opening sensor for detecting a throttle opening; virtual throttle opening converter for calculating a driving force that is outputted from the automatic transmission according to a predetermined shift map based on the vehicle speed and the throttle opening, setting a target driving force characteristic whose parameters are the vehicle speed and the throttle opening according to a result of the calculation, and converting the target driving force into a virtual throttle opening by using the target driving force characteristic and the detected vehicle speed; throttle opening information selector for selecting the virtual throttle opening from the virtual throttle opening converter as throttle opening information when a driving force is controlled, and selecting an actual throttle opening from the throttle opening sensor as throttle opening information when a driving force is not controlled; and target shift value calculating means for calculating a target shift value according to the selected throttle opening information, the detected vehicle speed value and said predetermined shift map.

In one preferred form of the present invention, the onboard control device calculates a target driving force so as to maintain a constant vehicle distance or vehicle speed.

In another preferred form of the present invention, the virtual throttle opening converter outputs the converted virtual throttle opening to a gear ratio control system of the automatic transmission and a throttle control system of an engine so as to control an engine torque and a gear ratio of the automatic transmission.

In yet another preferred form of the present invention, the automatic transmission is a continuously variable transmission that determines an achievable gear ratio, which should finally be achieved, according to a target input revolutionary speed calculated by the target shift value calculating means and a detected output revolutionary speed, and a transitional target gear ratio until the achievable gear ratio is reached, thereby controlling the gear ratio continuously.

In yet another preferred form of the present invention: the virtual throttle opening converter makes the target driving force dimensionless by using a maximum driving force for an applied vehicle speed and then converts the target driving force into the virtual throttle opening.

According to the present invention, the onboard control device calculates the target driving force; and its virtual throttle opening converting means calculates a driving force that is outputted from the automatic transmission according to a predetermined shift map based on the vehicle speed and the throttle opening, sets the target driving force characteristic whose parameters are the vehicle speed and the throttle opening based on the result of the calculation, and converts the target driving force into the virtual throttle opening by using the target driving force characteristic and the detected vehicle speed. The throttle opening information selecting means selects the virtual throttle opening from the virtual throttle opening converting means as throttle opening information when the driving force is controlled, and selects the actual throttle opening from the throttle opening sensing means as throttle opening information when the driving force is not controlled. The target shift value calculating means calculates a target shift value according to the selected throttle opening information, the detected vehicle speed value and the predetermined shift map. The gear ratio of the transmission is controlled in such a manner as to achieve the target shift value. The target driving force can be achieved by controlling the output from the transmission in this manner.

More specifically, the target shift value calculating means calculates the target shift value by using the throttle opening information selected between the virtual throttle opening and the actual throttle opening. Therefore, only one shift map should be set irrespective of whether the virtual throttle opening is outputted or not i.e. whether the driving force is controlled or not.

It is therefore possible to control the driving force by changing the gear ratio of the automatic transmission with the same shift transition characteristic irrespective of whether the driving force is controlled or not. Thus, the load of matching constants is reduced, and a computer program is simplified. This makes it easier to apply the driving force control device to the vehicle.

When the control device provided in the vehicle calculates the target driving force so as to maintain a constant vehicle distance or a constant vehicle speed, it is possible to control the driving force in such a manner as to maintain a constant vehicle distance or vehicle speed by changing the gear ratio of the automatic transmission without adding a new shift map to the shift map that is used in the normal shift control.

In a case where the virtual throttle opening converting means outputs the converted virtual throttle opening to the gear ratio control system of the automatic transmission and the throttle control system of the engine, the driving force is controlled by controlling both the engine torque and the gear ratio of the automatic transmission. This makes it possible to achieve the target driving force with excellent responsiveness and preferable convergence with respect to changes in the target driving force.

When the automatic transmission is a continuously variable transmission that determines an achievable gear ratio, which should finally be achieved, according to the target input revolutionary speed calculated by the target shift value calculating means and the detected output revolutionary speed, and the transitional target gear ratio until the achievable gear ratio is reached, thereby controlling the gear ratio continuously, the driving force is controlled by continuously changing the gear ratio so that the driving force can correspond to the target driving force. Moreover, the transition target gear ratio is determined according to the achievable gear ratio, and thus the shift transition characteristic is stable since it is affected by the changes in the shift environment to only a small extent.

To the contrary, if, for example, the automatic transmission is a multi-speed transmission, the change in the shift position causes the gear ratio to change greatly. It is therefore impossible to control the driving force in such a manner that the driving force strictly corresponds to the target driving force. Moreover, the shift transition characteristic is unstable because it is greatly affected by the change in the shift environment.

In the present invention, if the virtual throttle opening converting means makes the target driving force dimensionless by using the maximum driving force for an applied vehicle speed and then converts the target driving force into the virtual throttle opening, the sensitivity per vehicle speed of the driving force-throttle opening is leveled by making the target driving force dimensionless by using the maximum driving force for the applied vehicle speed, and this improves the accuracy in calculating the virtual throttle opening.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

The structure of the driving force control device according to an embodiment will be described hereinbelow with reference to the accompanying drawings.

Figure 1:
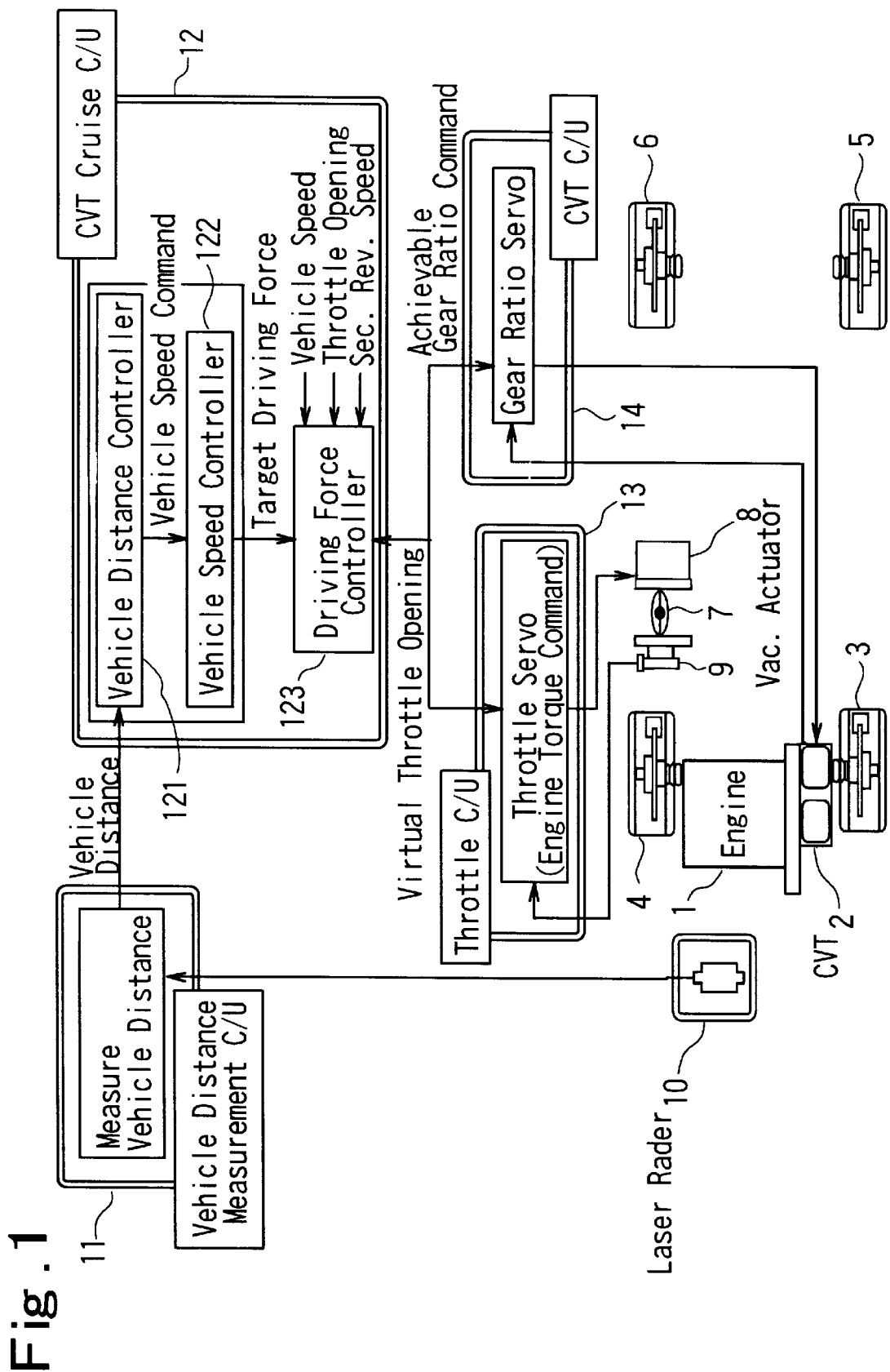
FIG. 1 is a block diagram showing a CVT cruise system to which a driving force control device according to an embodiment of the present invention is applied.

FIG. 1 is a block diagram showing a CVT cruise system, to which a driving force control device according to the embodiment is applied.

On a vehicle having front left and right wheels 3, 4 and rear left and right wheels 5, 6, a belt-type CVT 2 is adapted to a power train from an engine 1 to the front left and right wheels 3, 4.

A throttle valve 7 of the engine 1 is provided with a negative pressure actuator 8 that controls a valve opening according to commands from outside, and a throttle opening sensor 9 that detects the valve opening of the throttle valve 7.

A laser radar 10 is mounted at the front of the vehicle and outputs radar information for use in measuring the distance between the vehicle and a vehicle ahead.

A vehicle distance measurement control unit 11 measures the vehicle distance according to the radar information from the laser radar 10.

The CVT cruise control unit 12 maintains a predetermined distance (between the vehicle and the vehicle ahead) and maintains a predetermined vehicle speed. The control unit 12 contains a vehicle distance controller 121 that calculates a vehicle speed command value (vehicle speed command in FIG. 1) according to vehicle distance information; a vehicle speed controller 122 that calculates a target driving force according to a vehicle speed command value from the vehicle distance controller 121; and a driving force controller 123 that calculates a virtual throttle opening and an achievable gear ratio according to the target driving force from the vehicle speed controller 122.

A throttle control unit 13 controls a vacuum actuator 8 so as to achieve a throttle opening corresponding to an engine torque command value (engine torque command in FIG. 1). The throttle control unit 13 receives virtual throttle opening information from the driving force controller 123 and determines an engine torque command value according to this information. The throttle control unit 13 then outputs the engine torque command value to the vacuum actuator 8. The throttle control unit 13 constructs a servo system that executes a feedback control so that an actual throttle opening of the throttle valve 7 can correspond to the engine torque command value.

A CVT control unit 14 controls a gear ratio of the belt-type CVT 2 so as to achieve a target gear ratio. The CVT control unit 14 receives an achievable gear ratio command value (achievable gear ratio command in FIG. 1 and FIG. 2) from the driving force controller 123 to determine a transitional target gear ratio that is used until the achievable gear ratio is achieved. The CVT control unit 14 then outputs a command for achieving the target gear ratio to a hydraulic pressure control valve unit 15 as a shift actuator. The CVT control unit 14 constructs the servo system that executes the feedback control so that an actual gear ratio can correspond to the target gear ratio.

Figure 2:
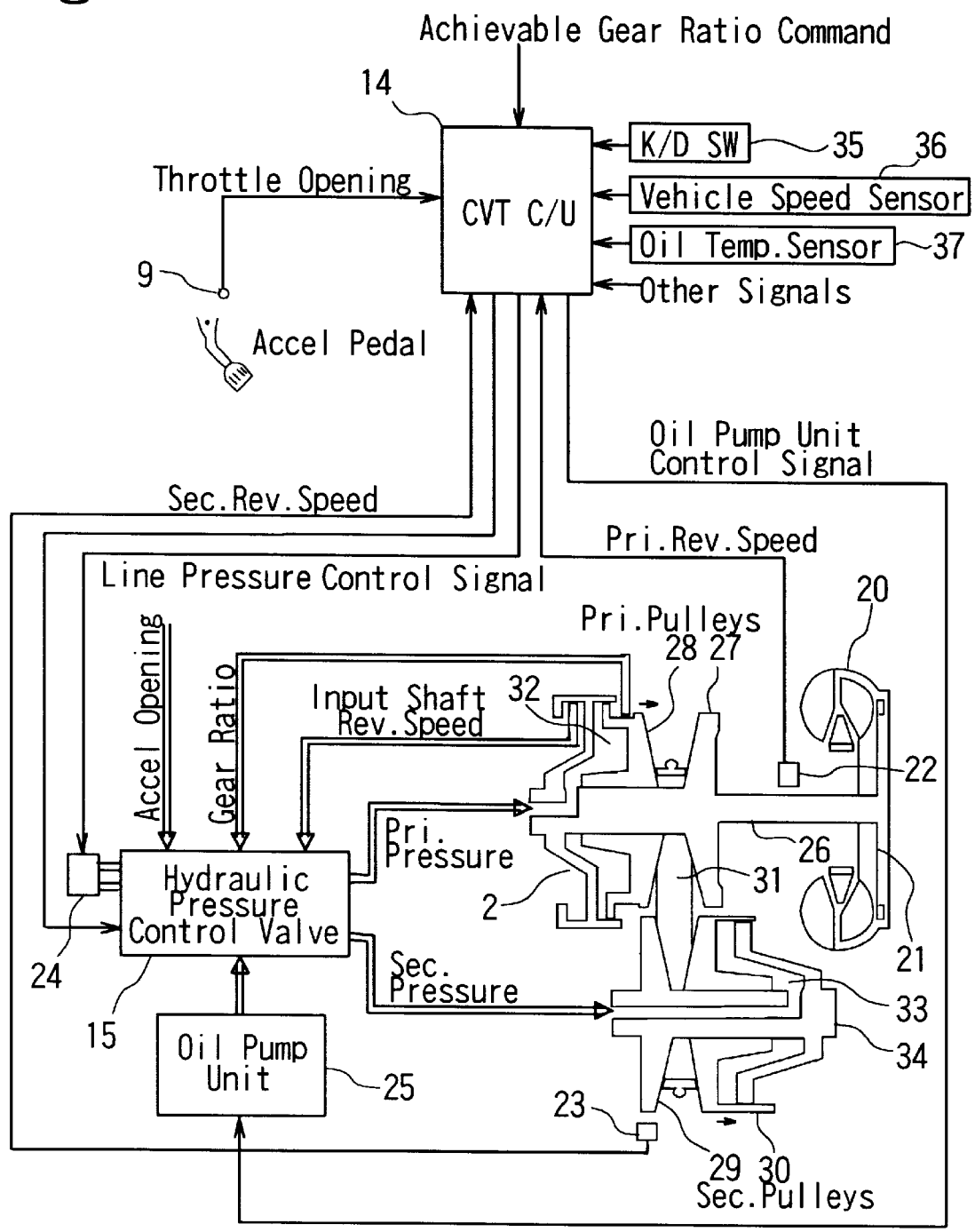
FIG. 2 is a diagram showing a belt-type continuously variable transmission and a shift control system in the embodiment.

FIG. 2 is a diagram showing a belt-type continuously variable transmission and a shift control system according to the embodiment. A line pressure solenoid 24 is adapted to the hydraulic pressure control valve unit 15, and the hydraulic pressure control valve unit 15 controls a hydraulic pressure from an oil pump unit 25.

An output shaft of the engine 1 connects to the torque converter 20 serving as a rotation transmission mechanism. In the torque converter 20, the lockup clutch 21 is provided which directly connects the engine 1 with the belt-type CVT 2 by engaging.

A transmitting side of the torque converter 20 connects to an input shaft 26 of the transmission. Primary pulleys 27, 28 of the belt-type CVT 2 are provided at the ends of the input shaft 26.

The belt-type CVT 2 has the primary pulleys 27, 28; secondary pulleys 29, 30; and a belt 31 that transmits rotating torques from the primary pulleys 27, 28 to the secondary pulleys 29, 30. The moving pulley 28 is capable of moving along the axis of the input shaft 26 by a primary hydraulic pressure applied to a primary pulley cylinder chamber 32. The moving pulley 30 is capable of moving along the axis of an output shaft 34 by a secondary hydraulic pressure applied to a secondary pulley cylinder chamber 33. A driving gear that is not illustrated is secured to the output shaft 34, and the driving gear drives a drive shaft reaching a driving wheel via a pinion provided on an idler shaft, a final gear and a differential unit.

The moving primary pulley 28 and the moving secondary pulley 30 are axially moved to change the radius of a part where they contact with the belt 31. This changes a revolutionary speed ratio of the primary pulleys 27, 28 to the secondary pulleys 29, 30, in other words, the gear ratio. The widths of a V-shaped pulley grooves on the primary pulleys 27, 28 and the secondary pulleys 29, 30 are changed by producing a primary hydraulic pressure and a secondary hydraulic pressure at the hydraulic control valve unit 15 according to commands from the CVT control unit 14 and then supplying the respective pressures to the primary pulley cylinder chamber 32 and the secondary pulley cylinder chamber 33.

The CVT control unit 14 and the driving force controller 123 are connected to each other through a communication line that interchanges information. The CVT control unit 14 receives an achievable gear ratio command value from the driving force controller 123. The CVT control unit 14 and the driving force controller 123 receive a throttle opening signal from the throttle opening sensor 9, a switch signal from a kickdown switch 35, a vehicle speed signal from a vehicle speed sensor 36, a transmission oil temperature signal from an oil temperature sensor 37, a primary revolutionary speed signal from the primary revolutionary speed sensor 22, a secondary revolutionary speed signal from the secondary revolutionary speed sensor 23, and other signals. The CVT control unit 14 performs operation according to the received signals to output a line pressure control signal to a line pressure solenoid 24, output a gear ratio control signal to the hydraulic pressure control valve unit 15 and output an oil pump unit control signal to the oil pump unit 25.

Figure 3:
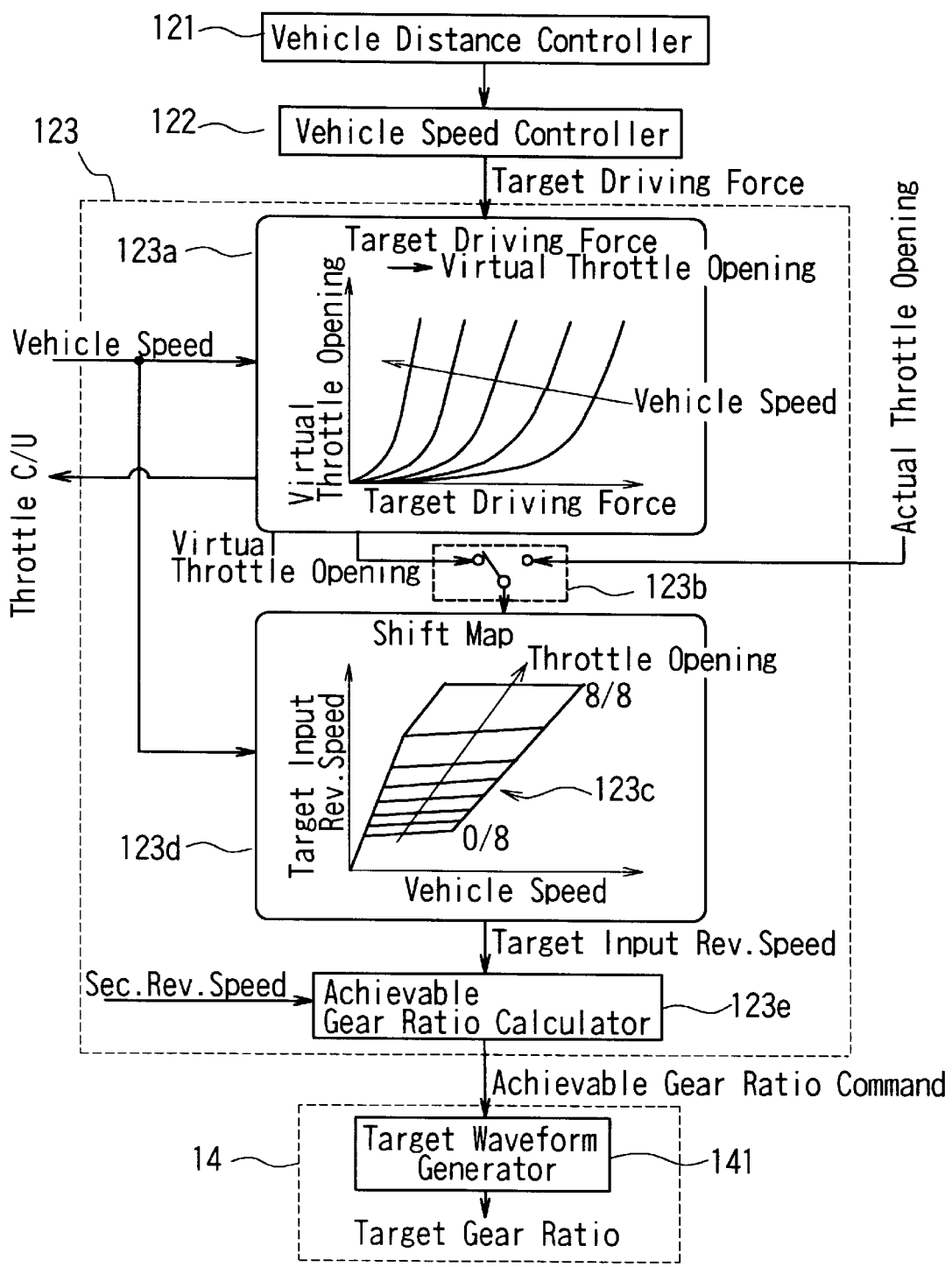
FIG. 3 is a block diagram showing a controlling operation performed by a driving force control system.

FIG. 3 is a block diagram showing the controlling operation of a driving force control system that is comprised mainly of the driving force controller 123. The driving force controller 123 has a virtual throttle opening converter 123a that converts the target driving force from the vehicle speed controller 122 into a virtual throttle opening; a throttle opening information selector 123b that selects the virtual throttle opening or the actual throttle opening; a shift map 123c showing a relationship between the vehicle speed, the throttle opening and a target input revolutionary speed; a target input revolutionary speed calculator 123d that calculates the target input revolutionary speed according to the shift map 123c; and an achievable gear ratio calculator 123e that calculates an achievable gear ratio according to the target input revolutionary speed and the secondary revolutionary speed (output revolutionary speed). The CVT control unit 14, which receives the achievable gear ratio command value, has a target waveform generator 141 that determines a transitional target gear ratio from the achievable gear ratio, which should be finally achieved, according to the vehicle speed, the throttle opening and so forth.

There will now be described the driving force controlling operation.

During the constant-speed regulation, the vehicle distance measurement control unit 11 measures the distance between the vehicle and the vehicle ahead according to the signal from the laser radar 10. The vehicle distance information is inputted to the CVT cruise control unit 12.

In the CVT cruise control unit 12, the vehicle distance controller 121 finds such a vehicle speed command value as to reduce the vehicle speed if the vehicle distance is smaller than a predetermined distance. The vehicle speed controller 122 then calculates such a target driving force as to achieve the commanded vehicle speed. The driving force controller 123 then receives the target driving force and outputs an achievable gear ratio command value to the gear ratio control system of the belt-type CVT 2 and the virtual throttle opening information to the throttle control system of the engine 1, so that the engine torque is controlled as well as the gear ratio of the automatic transmission.

There will now be described how to find the achievable gear ratio command value that is outputted to the gear ratio control system. The virtual throttle opening converter 123a calculates the driving force, which is to be outputted from the belt-type CVT 2, in advance according to the driving force inputted to the belt-type CVT 2 (the driving force is obtained from the throttle opening, an engine speed and a torque converter characteristic) and the gear ratio of the belt-type CVT 2 (the gear ratio is obtained from the shift map, the vehicle speed and the throttle opening). According to the result of the calculation, the virtual throttle opening converter 123a sets a target driving force characteristic whose parameters are the vehicle speed and the throttle opening. The virtual throttle opening converter 123a converts the received target driving force into the virtual throttle opening by using the target driving force characteristic and the detected vehicle speed.

When the driving force is controlled, the throttle opening information selector 123b selects the virtual throttle opening, which is outputted from the virtual throttle opening converter 123a, as the throttle opening information. When the driving force is uncontrolled, the throttle opening information selector 123b selects the actual throttle opening, which is outputted from the throttle opening sensor 9, as the throttle opening information. The target input revolutionary speed calculator 123d then calculates the target input revolutionary speed according to the selected throttle opening information, the detected vehicle speed and the shift map (which is also used for obtaining the target driving force characteristic). The achievable gear ratio operator 123e then calculates the achievable gear ratio according to a ratio of the target input revolutionary speed to the secondary revolutionary speed. The target input revolutionary speed calculator 123d forms the target shift value calculating means of the invention.

The target waveform generator 141 of the CVT control unit 14, which receives the achievable gear ratio command value, determines a transitional target gear ratio from the achievable gear ratio, which should be finally reached, according to the vehicle speed, the throttle opening and so forth. The belt-type CVT 2 is controlled to achieve the target gear ratio. In this manner, the output from the belt-type CVT 2 is controlled to the target driving force.

There will now be described the effects of the present invention.

1) Since the driving force controller 123 comprises: the virtual throttle opening converter 123a that converts the target driving force into the virtual throttle opening using the target driving force characteristic and the detected vehicle speed; the throttle opening information selector 123b that selects the virtual throttle opening or the actual throttle opening; and the target input revolutionary speed calculator 123d that calculates the target input revolutionary speed according to the selected throttle opening information, the detected vehicle speed and only one shift map, it is possible to control the gear ratio with the same transition characteristic during the shifting operation irrespective of whether the driving force is controlled or not, and also reduces the load of matching constants and simplifies a computer program. Therefore, the driving force control device can easily be applied to the vehicle.

More specifically, since the target revolutionary speed calculator 123d calculates the target input revolutionary speed by using the selected throttle opening information between the virtual throttle opening and the actual throttle opening, only one map has to be set as the shift map 123c, which is used for calculating the target input revolutionary speed, irrespective of whether the virtual throttle opening is outputted or not i.e. whether the driving force is controlled or not.

2) Since the control device that calculates the target driving force is comprised of the vehicle distance controller 121 and the vehicle speed controller 122 that maintain a constant vehicle speed while maintaining a predetermined vehicle distance, it is possible to control the driving force by changing the gear ratio of the belt-type CVT 2 in such a manner as to maintain a constant vehicle speed while maintaining a predetermined vehicle distance without adding any shift map to the shift map 123c that is used in the normal gear ratio control.

3) Since the virtual throttle opening converter 123a outputs the converted virtual throttle opening to both the gear ratio control system and the throttle control system, the driving force is controlled by controlling both the engine toque and the gear ratio, and this enables the control of the driving force with excellent responsiveness and preferable convergence with respect to changes in the target driving force.

4) And the belt-type CVT 2, which is used in the embodiment, determines the achievable gear ratio that should be finally achieved and depend on the target input revolutionary speed and the secondary revolutionary speed, and the transitional target gear ratio until the achievable gear ratio is reached, thus controlling the gear ratio continuously. It is therefore possible to control the driving force by varying the gear ratio continuously in such a manner that the driving force corresponds to the target driving force. Moreover, since the transitional target gear ratio is determined according to the achievable gear ratio, the change in the shift environment affects the shift transition characteristic to only a small extent and the driving force is controlled with high stability.

To the contrary, if the automatic transmission is the multi-speed type transmission, the change in the shift position causes the gear ratio to change greatly. It is therefore impossible to control the driving force in such a manner that the driving force strictly corresponds to the target driving force, and it is also impossible to control the driving force stably because the change in the shift environment greatly affects the shift transition characteristic.

Figure 4:
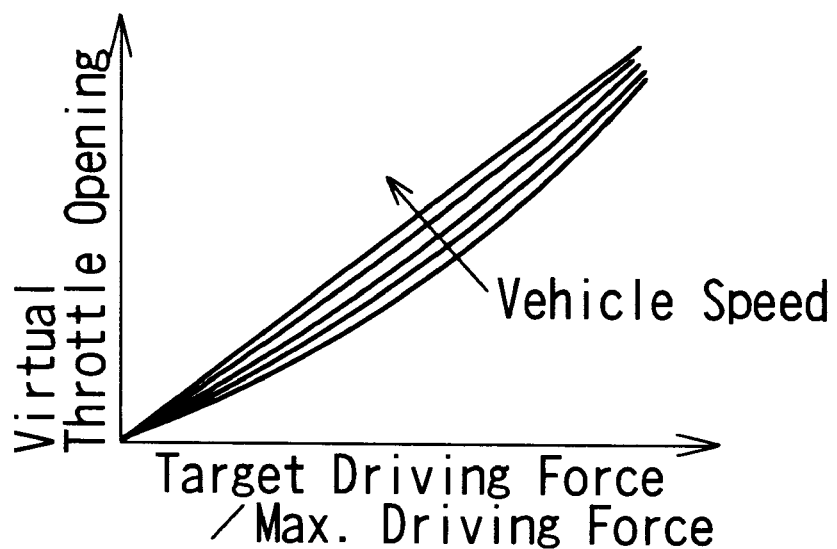
FIG. 4 is a diagram showing another example of a target driving force characteristic that is used by a virtual throttle opening converter.

Although the virtual throttle opening converter 123a in the above embodiment uses the target driving force as the target driving force characteristic, but the present invention should not be limited to this feature. For example, as shown in FIG. 4, the target driving force may be made dimensionless by using the maximum driving force for the applied vehicle speed and then converted into the virtual throttle opening.

The sensitivity per vehicle speed of the driving force-throttle opening is leveled by making the target driving force dimensionless by using the maximum driving force for the applied vehicle speed, and this improves the accuracy in calculating the virtual throttle opening.

In the embodiment, the belt-type CVT is used as the automatic transmission, but the present invention may be applied to other type of transmissions such as a troidal continuously variable transmission and a multi-speed transmission that determines a shift position by electronic control.

Although, in the embodiment, the target driving force is obtained by the vehicle distance controller and the vehicle speed controller in the CVT cruise control unit, the target driving force may also be obtained from another control system provided in the vehicle, which includes at least the target driving force in its output information.

What is claimed is:

1. A driving force control device, which controls a gear ratio of an automatic transmission to thereby achieve a target driving force calculated by an onboard control device, said driving force control device comprising:

vehicle speed sensor for detecting a vehicle speed;

throttle opening sensor for detecting a throttle opening;

virtual throttle opening converter for calculating a driving force that is outputted from said automatic transmission according to a predetermined shift map based on the vehicle speed and the throttle opening, setting a target driving force characteristic whose parameters are the vehicle speed and the throttle opening according to a result of the calculation, and converting said target driving force into a virtual throttle opening by using said target driving force characteristic and the detected vehicle speed;

throttle opening information selector for selecting the virtual throttle opening from said virtual throttle opening converter as throttle opening information when a driving force is controlled, and selecting an actual throttle opening from said throttle opening sensor as throttle opening information when a driving force is not controlled; and target shift value calculating means for calculating a target shift value according to the selected throttle opening information, the detected vehicle speed value and said predetermined shift map.

2. A driving force control device according to claim 1, wherein:

said onboard control device calculates a target driving force so as to maintain a constant vehicle distance or vehicle speed.

3. A driving force control device according to claim 1 wherein:

said virtual throttle opening converter outputs the converted virtual throttle opening to a gear ratio control system of said automatic transmission and a throttle control system of an engine so as to control an engine torque and a gear ratio of said automatic transmission.

4. A driving force control device according to claim 1, wherein:

said automatic transmission is a continuously variable transmission that determines an achievable gear ratio, which should finally be achieved, according to a target input revolutionary speed calculated by said target shift value calculating means and a detected output revolutionary speed, and a transitional target gear ratio until said achievable gear ratio is reached, thereby controlling the gear ratio continuously.

5. A driving force control device according to claim 1, wherein:

said virtual throttle opening converter makes said target driving force dimensionless by using a maximum driving force for an applied vehicle speed and then converts said target driving force into said virtual throttle opening.

* * * * *